INVENTOR
Robert A. Reid

BY
Diggins & Le Blanc
ATTORNEYS

Oct. 10, 1961

R. A. REID 3,004,213

TUBE TESTER

Filed Sept. 5, 1958

INVENTOR
Robert A. Reid

BY
*Diggins & LeBlanc*
ATTORNEYS

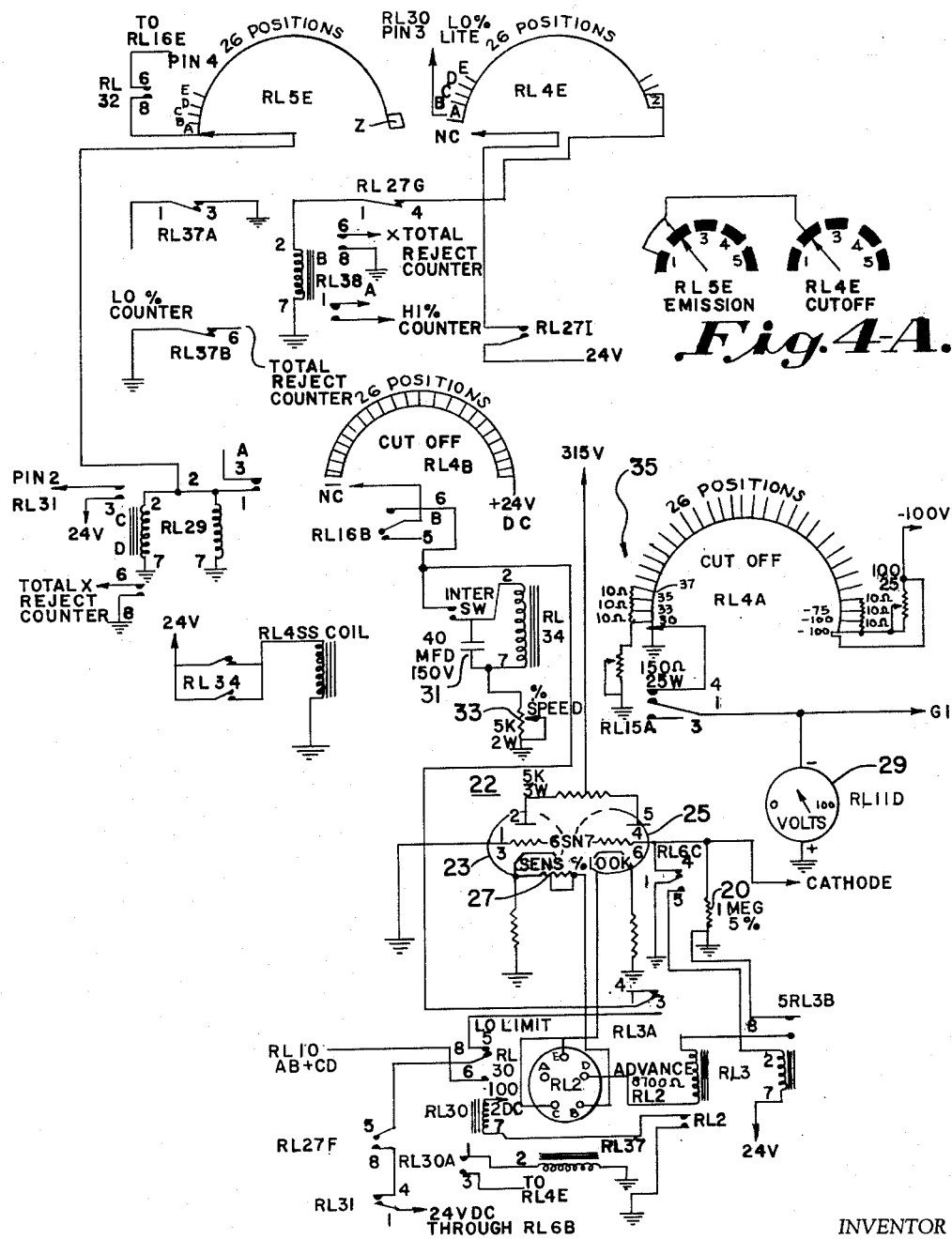

INVENTOR
Robert A. Reid
BY
Diggins & LeBlanc
ATTORNEYS

United States Patent Office

3,004,213
Patented Oct. 10, 1961

3,004,213
TUBE TESTER
Robert A. Reid, Atlantic Highlands, N.J., assignor to Thomas Electronics Inc., Passaic, N.J., a corporation of New Jersey
Filed Sept. 5, 1958, Ser. No. 759,161
5 Claims. (Cl. 324—23)

This invention relates to tube testers and more particularly is concerned with a production type automatic tester for checking several parameters of cathode ray tubes.

At the present time, there is no suitable equipment available on the market for automatically testing mass produced cathode ray tubes. The present procedure is to employ an operator or a series of operators near the end of the production line for manually taking readings of the more important tube characteristics such as the emission cut-off, and gas ratio as the cathode ray tubes pass along the assembly line. Ordinarily the operator makes an individual reading for each parameter being considered. The operator then has a chart which he must consult in order to decide whether or not the particular tube under consideration is to be rejected. Due to the unavoidable human error factor, many tubes thus passed by the operators may be faulty in any of one or several respects. Similarly, there is considerable temptation on the part of individual operators to pass tubes having border-line characteristics which, in fact, may not be suitable to be placed on the market for general consumption.

The novel tube tester of the present invention is designed for process control testing and quality control evaluation for industry. The tester is fully automatic and may require no operator when used with conveyorized operation. It may be used to measure shorts, to check total emission and cut off characteristics of the tube as well as gas ratio vs. emission characteristics. The tester provides output sources for automatic recordings of all the above-mentioned metered parameters for a permanent production record and for use in product evaluation. In addition, the present invention roughly halves the time required per tube for making these tests.

Major features of the present invention are a series of balancing networks, a plurality of low limit meter relays providing for the immediate rejection of tubes failing to meet certain pre-determined conditions, and a series of stepper relays for balancing out various tube parameters which permit an accurate recording of the cathode ray tube characteristics in discrete step values particularly suited for use in conjunction with digital display equipment.

It is accordingly one object of the present invention to provide a fully automatic device for testing cathode ray tubes.

Another object of the present invention is to provide an automatic tube tester for conducting a plurality of checks on cathode ray tubes.

Still another object of the present invention is to provide a production line tester for cathode ray tube manufacturers which provides for automatic recording of all metered parameters for use in conveyorized operations.

An additional object of the present invention is to provide a cathode ray tube testing unit which reduces to one-half the time required for testing each tube.

These and further objects and advantages of the invention will become apparent upon reference to the following specification, claims and appended drawings wherein:

FIGURE 4 is a circuit diagram of a portion of the tube tester of the present invention used in obtaining the cut-off characteristics of a cathode ray tube;

FIGURE 4A is a simplified illustration of strapping which may be employed between the emission and cut-off stepper switches to provide for the rejection of tubes having a satisfactory total emission with no grid voltage impressed but an unsatisfactory emission for the cut-off exhibited;

Figure 1:
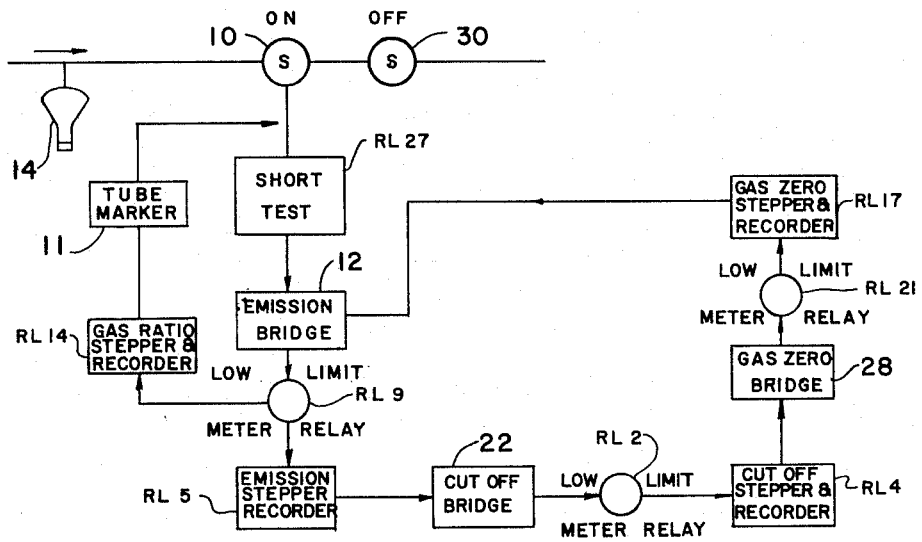
FIGURE 1 is an overall block diagram showing the interconnection of the major components of the tube tester of the present invention and indicating the time sequence of a single testing cycle.

The several sheets of drawing represent the tube tester broken down into functional elements for simplicity of depiction and explanation. Certain relays, contacts, elements and subcircuits appear on more than one sheet of drawing since this facilitates easier following of the description of the circuits. Interconnections between lines on the various sheets are indicated by the symbols on the sheets as is the custom with diagrams of this type. Descriptive letter and number reference characters are used in the customary manner of use of these skilled in the art in order to reduce the amount of descriptive matter necessary to a clear understanding of the operation of the unit.

Referring specifically to the drawings, in FIGURE 1 there is shown an overall block diagram of the major components of the tube tester of the present invention indicating the sequence of events involved in a single complete test cycle. The present invention is adapted for use in the mass production of cathode ray tubes in which a continuous series of cathode ray tubes enter a test room on a suitable conveyor. In accordance with current procedure, the tubes are carried face up on a conveyor carrier supported by a pair of parallel spaced rails. The carrier may be of the type disclosed in the assignee's copending application Serial No. 712,219 filed January 30, 1958. In the test room an assembler places a yoke and socket on the tubes as they pass by. Further movement of the tubes through the test room to a testing station causes the conveyor passing over the rails to trip an on-cycle microswitch, thus starting the sequence of test operation described below.

As one of the cathode ray tubes to be tested, indicated at 14, reaches the test station the rails upon which the tube is conveyed pass over and trip an "on" microswitch 10. At the same time suitable means (not shown) may be provided for operatively connecting the tube tester to the various electrode pin connections of the tube, or if desired, the tube may be connected to the tester by hand.

As the tube comes into the test position, a short test relay RL27 is activated and the short test is made just prior to activation of the switch 10. If one or more shorts exist relay 35 is energized. This relay operates to completely stop the test cycle and in addition energizes a reject indicator and a reject counter.

Subsequent to the short test the tube is automatically coupled to an emission bridge 12 and undergoes a total emission test. The tester includes a low limit meter relay RL9 for immediately rejecting all tubes which do not possess a minimum amount of cathode emission. The bridge 12 is balanced out by an emission stepper switch and recorder RL5 which retains the emission reading for the remainder of the cycle.

After the emission test the tube undergoes a cut-off test. Such a test indicates the control the grid maintains over the cathode emission and records the negative bias voltage necessary on the grid to completely cut off the tube. The cut-off test involves a cut-off bridge 22, a low limit meter relay RL2 and a cut-off stepper and recorder RL4.

The final test is the gas ratio test or the ratio of the ion current to the emission current when the tube is biased to draw about 500 microamperes of total current. This test also involves emission bridge 12, low limit meter relay RL9 and a gas ratio stepper and recorder RL14. If desired a conventional tube marker 11 may be connected to the gas ratio stepper and recorder unit to provide suitable legends on the tube at the end of a test cycle indicating that the tube is acceptable or satisfactory in having passed all the tests.

Short check

Figure 2:
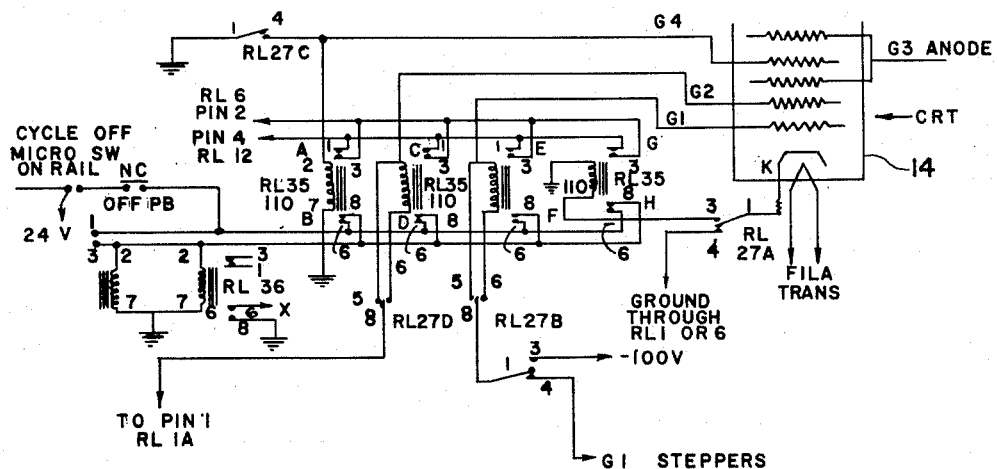
FIGURE 2 is a circuit diagram of a portion of the tube tester of the present invention employed in checking for interelectrode shorts.
Figure 7:
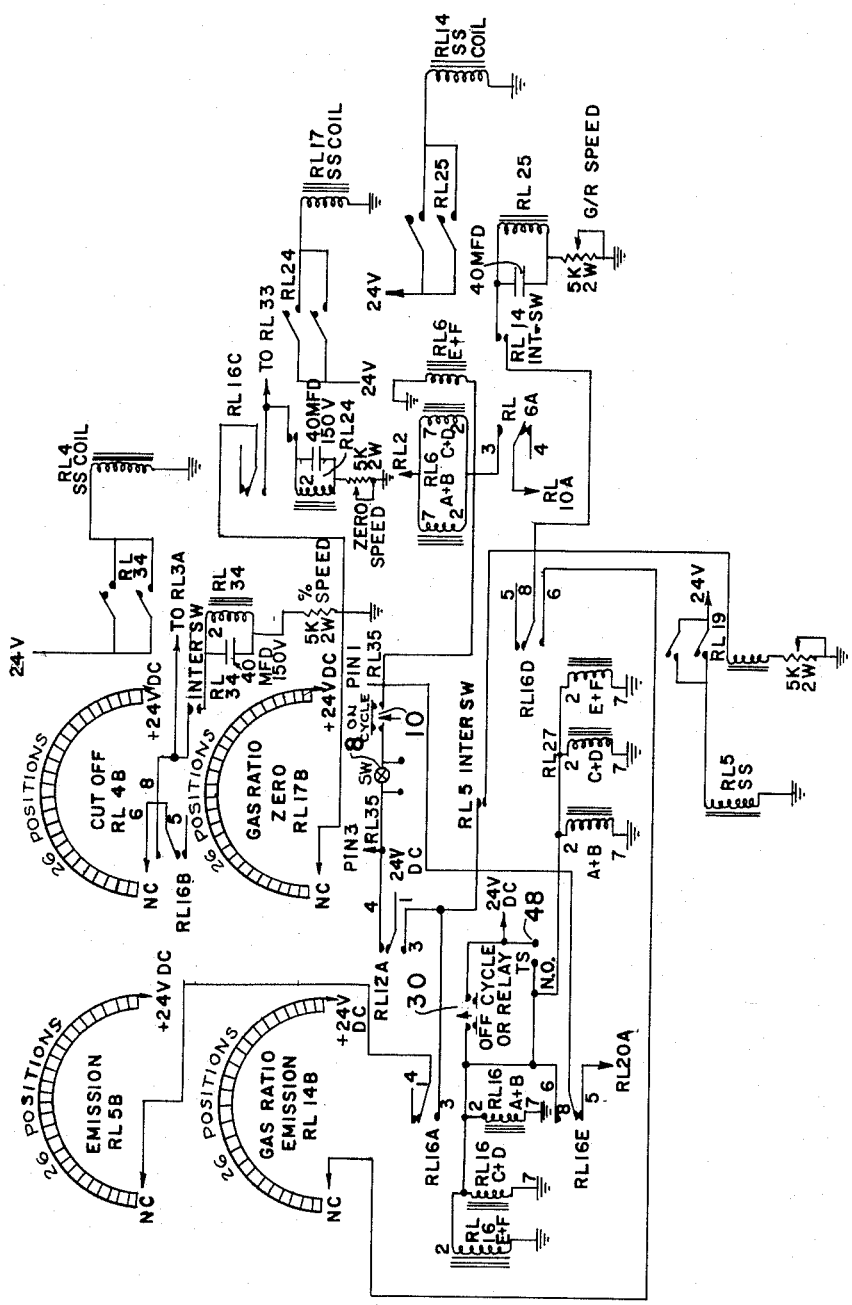
FIGURE 7 is a circuit diagram showing the off-cycle sequence of the tube tester of the present invention.

As the tube comes to the test position, it is first placed into a short check test and the circuitry for accomplishing this is shown in FIGURE 2. This figure shows the cathode ray tube 14 connected into the circuit of the short check relays RL35AB, CD, EF, GH. Relays RL27AB, CD, EF, the coils of which are shown in FIGURE 7, have contacts in FIGURE 2 which enter into the operation of this portion of the circuit. Referring for the moment to FIGURE 7, the test unit of the invention is made ready for operation by means of a manually operated switch 8 which is in series with the normally closed "on cycle" switch 10. This switch in turn is connected to relays, RL6AB, CD, EF and the other side of RL6EF is connected to the ground. The left side of manually operated switch 8 in FIGURE 7 is connected to a source of 24 volt D.C. through pins 1 and 4 of a relay RL12A.

When the unit is placed into operation manually operated switch 8 is closed, thereby placing 24 volts on RL6 to energize that relay for a purpose presently to become apparent.

RL27 is at this time also energized through the "off cycle" switch 30 by a 24 volt D.C. supply. The "off cycle" switch 30 is normally open and is closed at this time for reasons to be described in detail presently.

Figure 3:
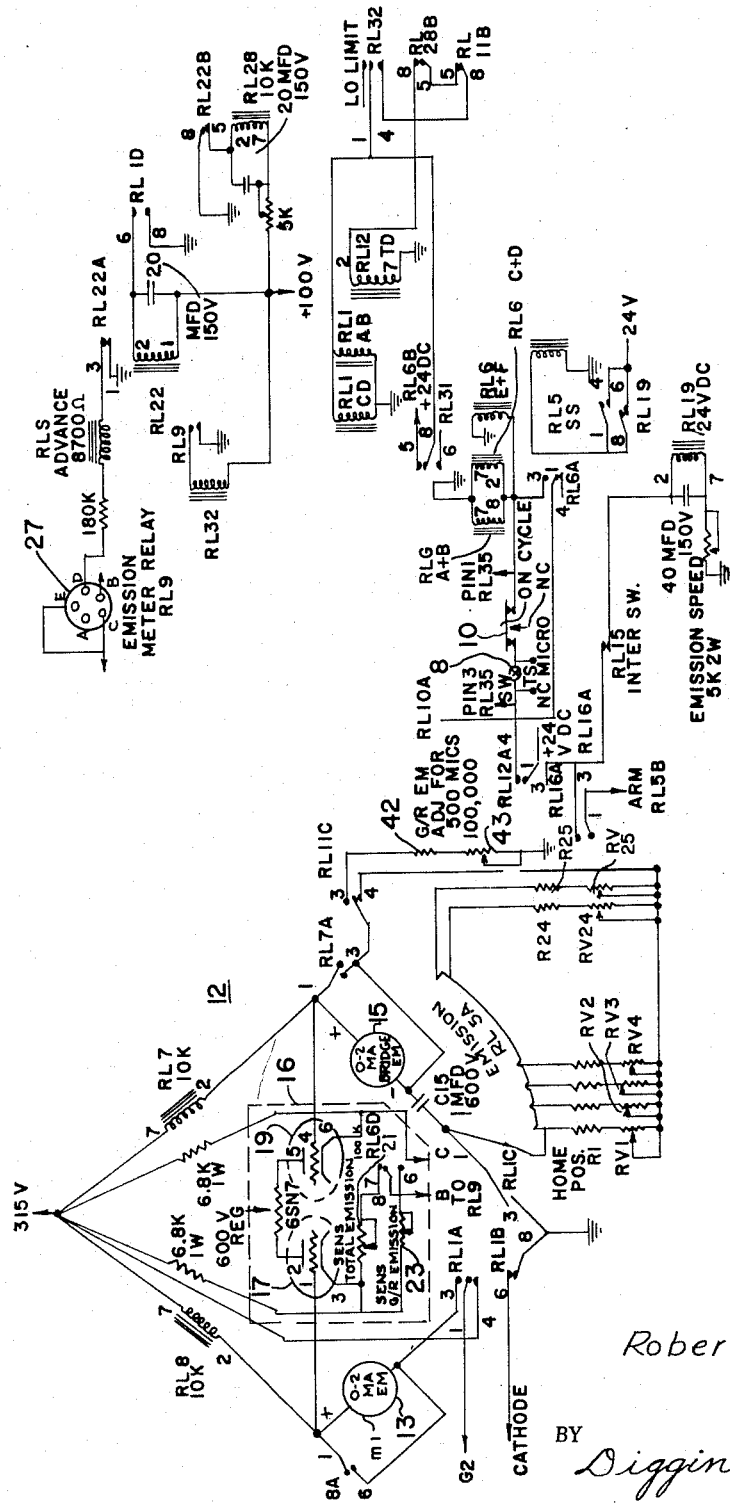
FIGURE 3 is a circuit diagram of a portion of the tube tester of the present invention employed in checking the total emission current of a cathode ray tube.

Turning to FIGURE 2, and recalling that relay RL27 is energized, RL27A has pin 1 in contact with pin 3, RL27B has pin 8 in contact with pin 6, RL27C is open, RL27D has pin 8 in contact with pin 6, and RL27E has pin 1 in contact with pin 3. Under these circumstances it will be seen that the cathode of CRT 14 is connected to ground through pins 1 and 3 of RL27A and through the coil of RL35GH. The first grid G1 of the tube is connected to a −100 volt D.C. supply through the coil of RL35EF, pins 6 and 8 of RL27B, and pins 1 and 3 of RL27E. The second grid G2 is connected to a 315 volt D.C. supply through the coil of RL35CD, pins 6 and 8 of RL27D and RL1A (FIGURE 3). The fourth grid G4 is connected to ground through the coil of RL35AB.

If not interelectrode short exists in the cathode ray tube 14, none of the relays RL35AB, CD, EF, GH will be energized. If, however, any of the electrodes are shorted, a relatively high voltage is placed across one or more of the relays RL35AB, CD, EF, GH to energize that relay and close its associated contact pins 1—3 and 6—8 which are otherwise open. The contact pins 6 and 8 of any of relays RL35AB, CD, EF, GH operate relay RL31 which in turn operates the total reject light and a conventional counter, not shown. The operation of any of the relays RL35AB, CD, EF, GH also closes pin 1—3 of the relay and these are connected across manual switch 8 and "on cycle" switch 10 in FIGURE 7.

It will be recalled that "on cycle" switch 10 is a normally closed switch and that relay RL6 is initially energized when this switch is closed. As the tube advances to the short check test the "on cycle" switch is opened thereby de-energizing relay RL6. If, however, a short exists, switches 8 and 10 are shorted by contact pins 1—3 of one of the relays RL35AB, CD, EF, GH so that relay RL6 remains energized and this prevents further operation of the test cycle as will become more apparent on reference to the following description of the operation of the emission check. If a short exists in the tube this fact is indicated by the reject light, is recorded by the counter, and the test cycle is halted until the tube is removed. If no short exists the unit automatically proceeds to the emission test.

Emission check

Referring to FIGURE 3, there is shown a bridge circuit indicated generally at 12 having upper legs formed by the windings of relays RL7 and RL8. The lower left leg of the bridge is formed by the cathode ray tube, that is, this leg is connected to the cathode and second grid G2 of the tube. The lower right leg of the bridge is formed by a series of resistances which are selected by a stepper switch actuated by stepper switch relay RL5A. The two meters 13 and 15 in the lower legs of the bridge circuit are for calibration purposes.

When a positive voltage is applied to the top of the bridge circuit G2 current will flow to produce a voltage across the lower left leg of the bridge circuit. This may then be balanced by a voltage appearing across the selected resistances in the lower right hand leg of the bridge circuit. The balance or unbalance of the bridge is sensed by means of a conventional twin triode vacuum tube volt meter type circuit consisting of triode halves 17 and 19. As is well known, with the same voltage applied to the two grids, equal currents flow through both sections of the twin triode, the tube cathodes are at the same potential and no current flows between the terminals B and C. A pair of potentiometers 21 and 23 are provided in the circuit of the cathode of the left tube for the total emission and gas ratio emission tests respectively. The currents in the two tubes can be adjusted to balance by whichever potentiometer 21 or 23 is in the circuit at the time, in order to take care of variations in the tube sections.

Figure 8:
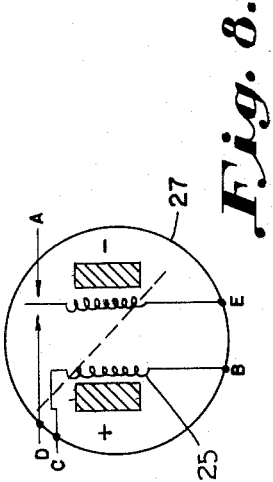
FIGURE 8 is a diagram of a typical contact meter used in the various tests.

The unbalance voltage appearing at terminals B—C is applied to the actuating coil 25 of a contact-type meter 27 shown in FIGURE 8. When this meter is in its rest position a contact is made between D and E and since E is connected to C this places a voltage on the left end of RL9 in the upper right corner of FIGURE 3, otherwise this meter reads the emission currents. The right hand portion of FIGURE 3 shows the connections of relays RL22, RL28, RL1, RL12, RL6, stepper relay RL5, and RL19, whose functions will presently become more apparent in a description of the operation of the illustrated circuit.

Recalling the operation of the short check test, it will be remembered that the "on cycle" switch is opened by a tube advancing to the test position. If a short exists in the tube, however, one of relays RL35AB, CD, EF, GH places a short circuit around the "on cycle" switch 10 to pins 1 and 3 of RL35 to keep energized relays RL6AB, CD, EF and stop the further functioning of the test unit.

Assuming that there is no short in the particular tube under test, and referring to FIGURE 3, relay RL6 is in the deenergized or released condition. Under these circumstances RL6B connects the windings of relays RL1AB, CD to a 24 volt supply to energize those relays. Relay RL1A in the lower left leg of the bridge circuit removes the direct connection of 315 volts to the second grid G2 and applies this voltage to G2 through relay RL8. Actuation of relay RL8 bypasses the meter 13 through RL8A to provide protection for the meter. Relay RL1C in the lower right leg of the bridge circuit grounds the bank of resistors which are selected by the stepper switch RL5A to complete the bridge circuit.

The bridge circuit will now be unbalanced by an amount which is a function of the emission of the tube. The unbalance of the bridge circuit causes the contact meter 27 to move up-scale thereby opening the contact between D and E so that the left side of relay RL9 in the upper right corner of FIGURE 3 is floating. The prior energization of RL1D has closed a 100 volt circuit to relay RL22, but the contacts of this relay do not close before the meter moves upscale by reason of the capacitor across the relay coil which provides a time delay. It is thus possible for an operator to read the emission of the tube from the meter without waiting for the balancing operation to occur.

When relay RL22 is energized the right end of relay RL9 is grounded and a second set of contacts RL22B is opened to de-energize relay RL28. A time delay is provided in the release of the contacts of this relay in order to allow the cathode ray tube emission to stabilize before the balancing operation occurs. When relay RL28 is finally de-energized, its contacts RL28B energize RL12 through the contacts RL28B, RL11B and RL32 to 24 volts received from RL6B. Energization of RL12 establishes a 24 volt supply to relay RL19 through RL12A and RL15. Relay RL19 in turn controls operation of the stepper relay RL5.

The stepper relay RL5 steps the movable arm of the stepper switch around in a conventional manner to sweep the resistances connected to the switch. When the stepper relay RL5 reaches the correct resistance necessary to balance the bridge circuit, the contact meter returns to its at-rest or zero reading, closing the contacts between D and E to thereby energize relay RL9. This energizes relay RL32 which opens the supply circuit to relay RL12. The contacts of relay RL12A move from pin 3 to pin 4, thus removing 24 volts from relay RL19. The stepper relay RL5 remains energized, however, due to the magnetic bypass contacts indicated at pins 1 and 4 and this holds the stepper at its final position so that the reading may be recorded. Relay RL12A, in addition to deenergizing relay RL19, re-energizes relay RL6 and contacts RL6B de-energize relay RL1. As a result the relays are all returned to their original positions and the total emission check has been fully accomplished.

*Cutoff check*

Another test incorporated in the cathode ray tube tester of the present invention is the so-called cutoff emission check or more simply the cutoff check. To be acceptable the cathode current of the tube must be cut off, i.e., reduced to zero when a certain predetermined range of cutoff voltage is applied to the first grid G1 of the tube. This test is accomplished by the circuitry shown in FIGURE 4.

The cutoff check involves a second bridge circuit indicated generally at 22 including the two halves of a twin triode labeled 23 and 25. In this arrangement the grid of tube half 23 is connected to ground. The grid of tube half 25, on the other hand, is grounded through a one megohm load resistor 20. In addition the ungrounded side of load resistor 20 is connected to the cathode of CRT 14.

In the operation of this circuit grid G1 of the cathode ray tube is initially at zero potential. In this case the emission current of the cathode ray tube 14 passes from the cathode through load resistor 20. Since load resistor 20 is connected to the grid of tube half 25 the emission current potential developed across load resistor 20 is applied to the grid and causes tube half 25 to draw more current than tube half 23. The resulting unbalancing potential developed across the cathodes of the tube halves 23 and 25 is applied to a relay meter RL2 identical in all respects to meter relay RL9 of FIGURE 3 which is shown in detail in FIGURE 8.

Through the operation of various relays which will be subsequently explained, a stepper relay RL4 is energized and caused to sweep over a series of resistors shown at 35 in FIGURE 4. In so doing, deck RL4A of the stepper switch RL4 applies increasing negative bias in two volt steps to the grid G1 of CRT 14. The volt meter 29 may be incorporated in the grid G1 circuit for the purposes of calibrating the stepper relay switch deck RL4A. As increasing negative bias is applied to grid G1 of the CRT, the tube approaches cut off and draws less current through its cathode. This results in a decrease in current through load resistor 20 and a reduction in the positive bias applied to the grid of tube half 25. When the voltage applied to the grid of the CRT from stepper switch deck RL4A reaches cutoff, the cathode current is zero and no bias potential is developed across load resistor 20. When this happens the tube halves 23 and 25 are balanced and no signal is applied to meter relay RL2.

A second stepper switch deck RL4B is driven in synchronism with stepper deck RL4A by stepper switch RL4 and functions to record the cutoff reading. As the sweeper arm of deck RL4A sweeps over the 26 positions to apply steps of increasing negative voltage to the cathode ray tube grid G1 the indicating arm of deck RL4B at the same time sweeps over 26 positions and comes to rest when the cutoff voltage is reached.

Considering now the detailed circuit action which brings about the foregoing cutoff test, the re-energization of relay RL6 at the end of the emission test previously described acted to move RL6C (FIGURE 4) from pin 4 to pin 5. This removed the short to ground previously existing across load resistor 20 and connected this resistor into the grid circuit of tube half 25. With load resistor 20 in the grid circuit of tube half 25 and also in the cathode circuit of CRT 14, the bias potential developed across resistor 20 causes an unbalance between the two halves 23 and 25. As a result the tubes draw different currents and the potential developed across their respective cathode resistors is unequal. The potentiometer 27 is provided for adjustment of the original bridge balance. The unbalance signal is in turn applied to pins B and C of meter relay RL2, the latter pin being in turn directly connected to pin E of this relay.

Movement of the arm on RL6C from pin 4 to pin 5 in addition serves to apply 24 volts to relay RL3 thus energizing this relay. With the unbalance voltage applied to meter relay RL2 and indicated by that meter the contacts RL3B are closed connecting contact D of the meter relay to ground through the coil of RL2. Since the indicator or pointer of RL2 is deflected to give the unbalance reading, contact D, of the meter as is more clearly indicated in FIGURE 8, is disconnnected from contact E and hence the coil of RL2 remains unenergized. Relay RL3A in moving from pin 4 to pin 3 supplies 24 volts to a delay relay RL34 by way of contacts RL31, RL27F, and RL30. Relay 34 includes a capacitor 31 providing a delay which allows the reading on meter relay RL2 to be independently read if so desired.

Relay RL34 in turn actuates stepper relay coil RL4. A variable resistor 33 is included in the stepper circuit for controlling and adjusting the speed of stepper relay RL4. Upon energization of the stepper relay RL4 the stepper switch decks RL4B and RL4A sweep over the indicated positions until cut-off bias is reached. At this point no potential is applied to the grid of triode half 25 and the unbalance signal applied to meter relay RL2 is reduced to zero. With no signal applied to pins B and C, contact E of meter relay RL2 as indicated in FIGURE 8 returns to rest position and connects to contact D. This results in the energization of the coil RL2 and the operation of this relay. Closing of relay RL2 grounds one end of relay RL30 which is thereby energized. The movement of the contact of relay RL30 away from pin 5 breaks the 24 volt supply circuit to relay RL34 which in turn de-energizes stepper relay RL4. This stops the stepper relay causing deck RL4B to remain at the position indicating the value of voltage required to cut off CRT 14.

Provisions are included in this circuit for completely rejecting a tube having a cutoff value that is either below or above a predetermined range of values. This is accomplished through a third stepper switch deck RL4E. Relay stepper switch deck RL4E moves in conjunction with stepper decks RL4A and RL4B as increasing bias voltage is applied to the grid G1 of the CRT. A tube having a low cut-off value will be unable to produce sufficient unbalance in the triode tube halves 23 and 25 to drive the sweeper arm of RL4E beyond the first position indicated at A in FIGURE 4. As a result the 24 volts supplied to the stepper sweeper arm of deck RL4E through RL27I will pass by way of contact A of stepper deck RL4E to pin 3 of RL30. Pin 3 is at that time in contact with pin 1 inasmuch as RL30 is energized through RL2. That is to say, the meter relay has moved up scale and then has moved down scale as the unbalance was reduced and has locked in contacts RL2. The movement of the stepper switch which occurred to balance the bridge, however, was not enough to carry the arm of deck RL4E past position A (which obviously may be made as extensive as desired). Thus 24 volts is fed to relay RL37 energizing that relay. Contacts RL37A of this relay close completing the circuit to a low cutoff counter while contacts RL37B energize a total reject counter.

Similarly if the CRT 14 cuts off at too high a voltage, the sweep arm of stepper switch deck RL4E will sweep over all 26 positions indicated and come to rest on the contact indicated at Z. This results in the energization of relay RL38B through relay RL27G. Relay RL38AB through pins 6 and 8 operates a total reject counter, and through pins 1 and 3 operates a high cut off counter.

By a proper predetermined strapping between stepper deck RL4E and emission stepper deck RL5E, the latter stepper can be utilized to give an indication of low emission during the cut off check. It sometimes happens that a tube will pass the total emission check shown and described above with reference to FIGURE 3 and yet possess insufficient emission to correspond to its cut-off voltage.

That is to say, the total emission test is applied with zero voltage on the first grid G1 and while the total emission indicated may be satisfactory for a certain range of cutoff voltages it is not adequate for the higher negative voltage necessary to produce cutoff in the particular tube. A simplified illustration of the principle relied upon is shown in FIGURE 4A. Referring to that figure simplified decks RL5E and RL4E are shown with only 5 positions each. If it is determined that a CRT with a cut-off which drives the stepper RL4E to at least position 2 should have an emission driving the stepper RL5E to at least position 3, then position 2 on RL4E is strapped to positions 1 and 2 on RL5E. Thus, it will be seen that when the arm of RL5E is not past position 2, a circuit through RL5E and RL4E will be completed for all tubes which have a cut-off driving the arm of RL4E as far as position 2. When this happens 24 volts supplied by way of RL27I passes through RL4E, RL5E to energize relay RL29. The operation of relay RL29 acts through pins 1 and 3 to place 24 volts on relay RL31 operating a total reject counter and a total reject light. RL31 also opens pins 1 and 4 thereof (bottom of FIGURE 4) to deenergize RL34 and thereby stop the stepper RL4.

*Gas ratio check*

Figure 5:
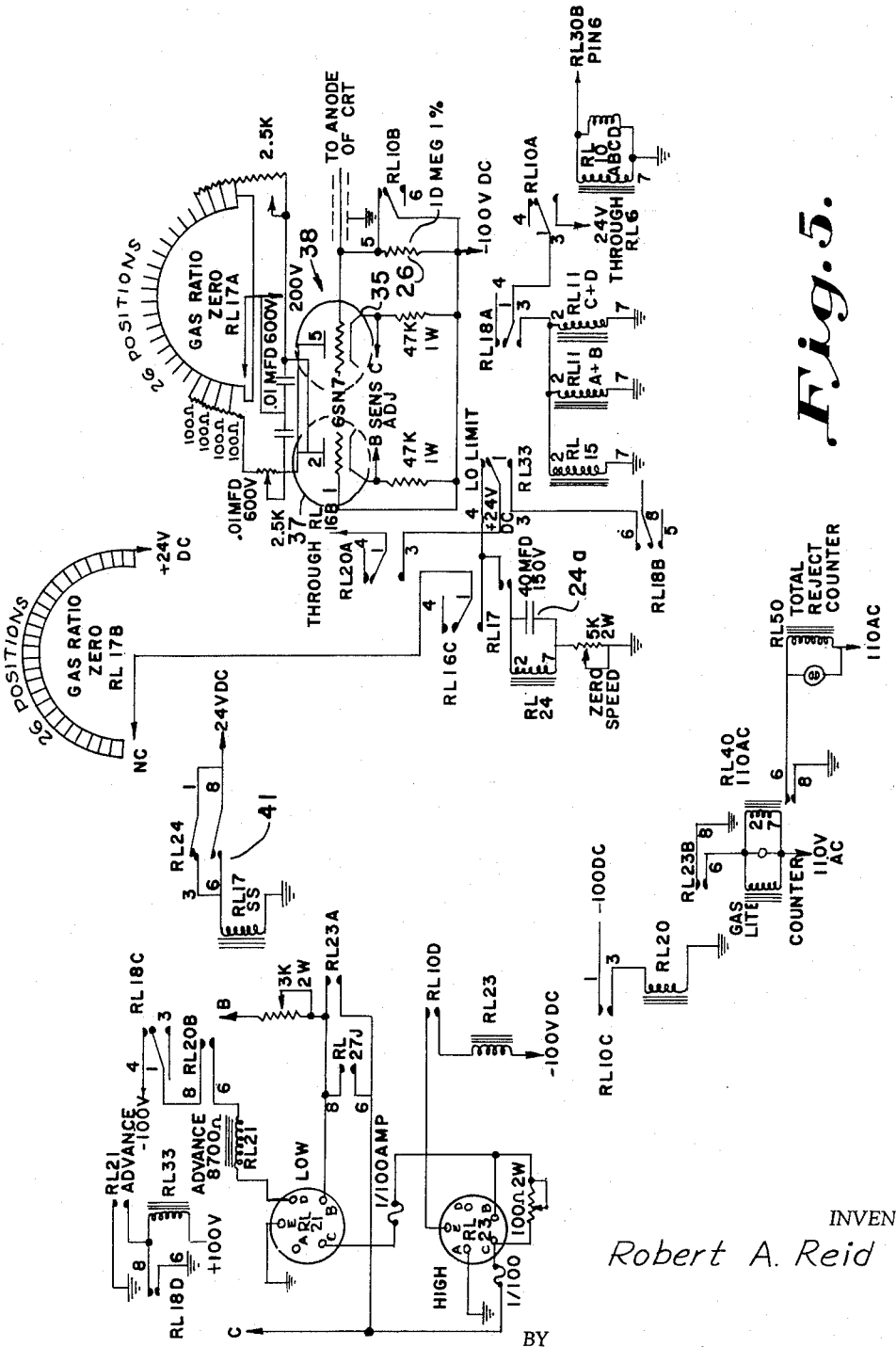
FIGURE 5 is a circuit diagram of a portion of the tube tester tube testing unit employed to zero out stray leakages to enable the highly sensitive gas ratio circuit to give an accurate reading.

Gas ratio zero is used to balance out leakages that exist in the equipment and tube prior to the gas ratio reading. The gas ratio zero circuit is shown in FIGURE 5 and involves a third balancing network indicated generally at 38. Balancing circuit 38 includes twin triode halves 35 and 37. In this arrangement a negative bias of minus 100 volts D.C. is applied to the anode of the CRT through a load resistor 26. In addition the CRT anode side of load resistor 26 is connected to the grid of triode half 35. The leakage current flowing through the CRT 14 and collected at the anode passes through load resistor 26 causing an unbalancing bias to be applied to the grid of tube half 35 unbalancing the twin triode. The unbalance voltage developed at the cathodes of tube halves 35 and 37 is applied by way of terminals B and C to a meter relay RL21. A second meter relay RL23 is connected in the meter relay circuit for the purpose of protecting meter relay RL21 from overload and rejecting high current tubes. Both meter relays are of the same type as illustrated in FIGURE 8.

Unbalance of the twin triode halves 37 and 35 actuates a relay RL17 driving stepper switch deck RL17A stepwise over a series of 100 ohm resistors. A second stepper deck RL17B is used to return the stepper switch to the home position after the test cycle, through RL16C. Stepper relay deck RL17A is connected in the plate circuit of the triode halves 35 and 37 and as the sweep arm moves across the 26 positions indicated RL17A reaches a position in which the currents flowing through the cathode resistors of triode halves 35 and 37 are equal. The value of plate resistance inserted by stepper deck RL17A necessary to balance out the unbalanced bias applied to the grid of tube half 35 by the leakage current flowing through CRT 14 is an indication of the leakage current flow through the tube with cut-off bias on the grid G1.

Proceeding now to a detailed description of the operation of this circuit, the activation of relay RL30 at the end of the cut-off check described above serves to energize relay RL10. This is accomplished through contact RL30B, pin 6, as indicated in FIGURE 5. With the closing of relay RL10 contact RL10A applies 24 volts to pin 1 of contact RL18A for purposes to be more fully described below in connection with the gas ratio check. Contact RL10B removes the short from around load resistor 26. The leakage current potential developed across load resistor 26 is consequently applied to the grid of tube half 35. Contact RL10C applies minus 100 volts to relay RL20 bringing this relay into operation. Contact RL10D completes a circuit through relay coil RL23 from protection meter RL23. However, since protection meter relay RL23 is connected for high limit operation no connection is made between terminals A and E thereof in the absence of meter energization in excess of the high limit. (See FIGURE 8). Thus while RL23 is deflected under the unbalance signal received from terminals B and C of the cathodes of tube halves 35 and 37 the coil of relay RL23 remains unenergized. Similarly contact RL20B closes a circuit to the coil of meter relay RL21 which remains unenergized inasmuch as the upscale movement of the meter has broken contact between terminals D and E thereof. (See FIGURE 8.) Contact RL20A applies 24 volts received from contact RL16B through relay contacts RL33 and RL17 to relay RL24. The contacts of RL24 activate stepper relay RL17 driving stepper decks RL17A and RL17B. A capacitor 24a is provided across relay RL24 to provide a time delay to allow the meters to give an accurate reading as in the preceding bridge circuits.

In the event of a short or an extremely gassy tube, protection meter relay RL23 will be overloaded and its internal contact will close a circuit between its terminals A and E. This completes the circuit through the coil of RL23 activating this relay. Contacts RL23A in closing provide a short across the input terminals B and C of meter relay RL21 thereby protecting this relay. In addition contacts RL23B close to operate a gas ratio zero light and counter through relay RL40 and a total reject light and counter through relay RL50.

If the CRT 14 under test passes the gas ratio zero check, stepper relay switch RL17A will reach a position in which leakage current flow is balanced out by the plate resistance in the triode halves 35 and 37. When the signal across terminals B and C reaches zero, the internal contacts of meter relay RL21 will close a circuit between its terminals D and E energizing the relay coil RL21. Relay RL21 in turn operates relay RL33 which in turn removes the 24 volt energizing potential from relay RL24. Relay RL24 includes a delay capacitor 24a and a speed control potentiometer similar in operation with that described with respect to the total emission check and cut-off check. De-energization of RL24 deactivates stepper relay RL17 thus stopping the arms of stepper decks RL17A and RL17B. Since relay RL17 includes a magnetic bypass contact 41 stepper relay switches RL17A and RL17B do not return to the home position but retain the balance position. Specifically, stepper deck RL17A stays at a position at which the plate resistance balances out the leakage current applied to the grid of tube half 35.

In the gas ratio zero check described above the bridge circuit 38 was balanced to cancel out the portion of the leakage current flow existing with cut-off bias on the grid G1. The gas ratio emission test now to be described concerns the ratio of the ion current to the cathode emission current drawn by grid G2 when the bias on grid G1 of the tube being tested is sufficient to draw a current of approximately 500 micro amperes.

Figure 6:
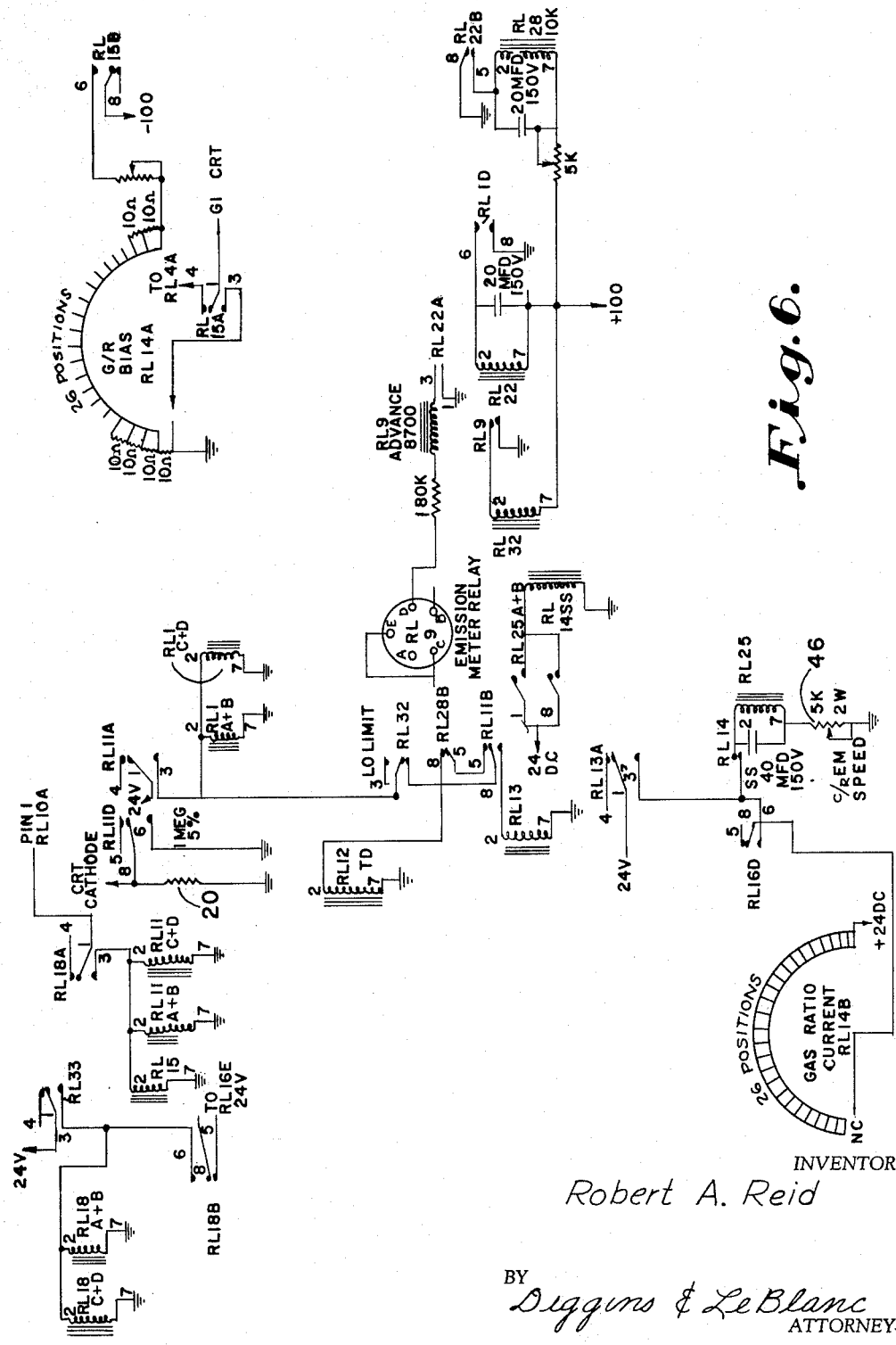
FIGURE 6 is a circuit diagram of another portion of the tube testing unit employed in obtaining the gas ratio characteristics of a cathode ray tube at a predetermined emission level.

As can be seen in FIGURE 6 the operation of relay RL33 at the end of the gas ratio zero check described above in moving from pin 4 to pin 3 applies 24 volts through relay RL18 to energize this relay. Contact RL18A completes the circuit to relays RL15 and RL11. Contacts RL11D in turn place a short around load resistor 29 and connect the cathode of CRT 14 to ground. The contact of RL11A moves from pin 4 to pin 3 operating relay RL1 which then closes the original emission bridge circuit 12 of FIGURE 3. In addition as shown in FIGURE 3 RL11C transfers the lower right hand arm of bridge 12 to a separate resistor 42 adjusted to draw 500 microamps from the bridge source by a variable resistor 43. As a result of the operation of relay RL1, cathode ray tube 14 is again connected in the lower left hand arm of bridge circuit 12 of FIGURE 3 by way of grid G2 and the grounded CRT cathode. In addition contact RL15A connects a gas ratio emission bias stepper deck RL14A to the grid G1 of CRT 14. (See FIGURE 6.)

As can be seen from the connections already described the gas ratio emission check involves the balancing bridge 12 of FIGURE 3 which was also used to measure total emission as previously described. Meter relay RL9 likewise serves both the total emission check and the gas ratio emission check. In operation the CRT is connected into the lower left arm of bridge 12 through the grid G2 and the cathode. At the same time the negative bias of 100 volts remains applied to the anode so that the tube draws ion current. In addition stepper deck RL14A connected into the grid G1 of CRT 14 as indicated in FIGURE 6 sweeps through a series of resistors to apply increasing steps of negative bias to the first grid of the cathode ray tube. The bias of the tube is in this manner increased until the total current drawn by the grid G2 of the tube reaches 500 micro amperes. When this value of current is reached the left arm of bridge 12 is balanced against the right arm containing resistor 42 previously adjusted by resistor 43 to draw 500 micro amperes of current. When the balance is reached the gas ratio emission value is indicated on a stepper deck RL14B which operates in conjunction with the bias stepper deck RL14A. Meter relay RL9 operates in a manner similar to that described in connection with the previous total emission test to give an initial indication of the bridge unbalance. The delay incorporated by means of a capacitor in relay RL25 retards the operation of stepper decks RL14A and RL14B for a sufficient time to allow the meter relay RL9 indicator to stabilize. Likewise upon reaching balance the signal from terminals B and C by way of potentiometer 23 in the bridge 12 reaches zero and meter relay RL9 closes to actuate the coil of that relay.

In conjunction with the previously described actuation of relay RL18 to energize relays RL15 and RL11, contacts RL18B close to maintain energization of relay RL18 until the end of a complete measuring cycle. Thus contacts RL18B form a self locking arrangement for relay RL18. Relay contact RL11B upon closing at the initiation of the gas ratio emission check supplies 24 volts to relay RL13 by way of RL28B, RL32, and RL11A. Contacts RL13A energize the delay relay RL25 including a speed control potentiometer 46. This latter relay serves to activate stepper relay RL14.

With the balanced voltage reached and the internal contact of meter relay RL9 closed to place terminal D in contact with terminal E relay coil RL9 is energized to operate relay RL32 as is best seen in FIGURE 3. Referring back to FIGURE 6, operation of relay RL32 breaks the 24 volt supply to relay RL13 in turn deactivating relays RL25 and RL14 and thus stopping the arms in stepper decks RL14A and RL14B. At this point all the tests on the cathode ray tube are complete and the test readings are recorded on the various stepper switches.

*Off cycle*

In FIGURE 7 is shown the circuitry and relays involved in readying the tube tester of the present invention for a new tube to be tested when the complete test of a first tube is at an end. This operation is commonly referred to as the "off cycle" sequence or merely the "off cycle." Operation of the normally open off cycle switch 30 either manually or by means of conveyor rails applies 24 volts to relays RL16A, B, C, D, E, F and RL27A, B, C, D, E, F. As has been fully explained above, the contacts of relay RL27 are activated at the end of the cycle to place the tester in readiness for testing for shorts in the next cathode ray tube. In this way the tube tester is automatically readied for immediate operation upon presentation of a tube.

FIGURE 7 also illustrates the four stepper switches RL4B, RL5B, RL14B, and RL17B which home the stepper relays acting to maintain the readings obtained in the various checks throughout the remainder of the test cycle. Specifically, stepper switch RL5B is associated with the total emission check, stepper RL4B the cut-off check, stepper RL17B the gas ratio zero, and stepper RL14B the gas ratio check. As will be noted from FIGURE 7 each of the stepper relay coils RL4, RL5, RL14 and RL17 has a magnetic holding relay associated therewith. Stepper coil RL4 for example is connected to a relay RL34 having both a conventional pair of contacts and a pair of magnetic contacts. Stepper relay coil RL5 is similarly connected to a composite type relay RL19 as is coil RL14 to composite relay RL25 and coil RL17 to relay RL24. In each case the magnetic contact serves to keep its stepper coil energized so that the stepper switches maintain their respective readings throughout the entire measuring cycle. In addition it will be noted that each of the stepper recorders is supplied with a positive D.C. voltage of 24 volts which is connected to all the active contacts of each stepper switch. However, the first contact indicated by the letters NC on the drawing represent a contact which has no voltage applied thereto.

Activation of the respective contacts of relay RL16 connects the indicator arms of the stepper switches to the respective composite relays for the purposes of returning the stepper arms to the "home" position. Emission stepper relay RL5B for example has its arm connected through relay contacts RL16A to composite relay RL19 which actuates the stepper coil RL5. When the cycle is at an end the sweep arm of relay RL5B will be at one of the active positions indicating the value of total emission of CRT 14 being tested. Closing relay RL16A connects the arm of stepper RL5B and therefore the 24 volts applied to this stepper to relay RL19 in such a direction as to break the magnetic holding contact of that relay. The result is that the coil of relay RL5 is de-energized and the sweep arm of stepper RL5B is returned to the home position contact. Stepper relay switch RL4B is similarly returned to the home position through contact RL16B connected to relay RL34. Stepper switches RL14B and RL17B are similarly de-energized through contacts RL16B and RL16C respectively. Relay RL16 is also provided with contacts RL16E which operate to self lock this relay in the energized position until the on cycle switch is next actuated. The operation of on cycle switches 8 and 10 and the initiation of a subsequent measuring cycle through relay RL6 has been fully described with reference to the initiation of a measuring or testing cycle.

As can be seen the present invention provides a fully automatic device for performing a series of tests on cathode ray tubes. Provision is included for recording readings on a plurality of stepper switches, with the readings being available throughout the entire remainder of the test cycle. As such the stepper switches provide a source for output to suitable permanent recording devices, for example an automatic printer, for making a permanent record of the readings obtained.

Also incorporated into the tester of the present invention are a group of automatic reject conditions. Any one of five different conditions, i.e., low emission, low cut off, high cut off, gas or shorts will cause the tube under test to be rejected. The display or recording device responsive to these conditions can indicate the tube directly or operate in conjunction with the mechanical marker 11 shown in FIGURE 1. The low emission rejection will operate any time the emission level is below the required minimum. This is accomplished by predetermined strapping between steppers RL5E and RL4E. These limits can be changed at any time by the insertion of a different strap plug.

All stepper relays can be checked for speed control by cycling the unit to the "off" position and advancing each stepper one position by hand. They should then cycle automatically to the "home" position. Likewise the emission potentiometer can be pre-set by removing relays RL12 and RL3. Then the "on cycle" switch 10 is pushed and relay RL5A advanced one position at a time through the 26th position.

All tester components are commercially available items. By way of example only, all twin triodes shown may be 6SN7's. The low and high limit meter relays RL2, RL9, RL21 and RL23 are commercially available contact meter relays.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tube tester comprising a bridge circuit, means for applying test voltages to a cathode ray tube to produce an output signal indicative of the emission characteristics of said cathode ray tube, means for applying said output signal to one side of said bridge circuit, a stepper switch for applying a stepwise increasing reference signal to the other side of said circuit, and magnetic means connected to said stepper switch to hold it in its final position for recording the reading of said reference signal when said bridge is balanced.

2. A tube tester comprising first and second bridge circuits, means for applying test voltages to a cathode ray tube to produce a first output signal indicative of the emission characteristics of said cathode ray tube, means for applying test voltages to said cathode ray tube to produce a second output signal indicative of the cutoff characteristics of said cathode ray tube, means for initiating a test of said emission characteristics by applying said first output signal to one side of said first bridge circuit, means for applying a step-wise increasing reference signal to the other side of said first bridge circuit, means for recording the discrete value of said reference signal when said bridge is balanced, and means responsive to balance of said first bridge circuit for initiating a test of the cut off characteristic of said tube.

3. A tube tester comprising first, second and third bridge circuits, means for applying test voltages to a cathode ray tube to produce first, second and third output signals indicative of the cathode emission, cut off and gas ratio characteristics respectively of said tube, means for applying one of said output signals to one side of said first bridge circuit to initiate a test, a stepper switch for applying a stepwise increasing reference signal to the other side of said first bridge circuit, means for recording the discrete value of said reference signal when said first bridge is balanced, means responsive to balance of said first bridge for applying another of said output signals to one side of said second bridge circuit, a stepper switch for applying a step wise increasing reference signal to the other side of said second bridge circuit, means for recording the discrete value of said reference signal when said second bridge is balanced, and means responsive to balance of said second bridge circuit for applying the third of said output signals to said third bridge circuit to initiate a third test.

4. A tube tester according to claim 3 wherein said stepper switches comprise a plurality of segmental stationary contacts swept by a movable contact to apply discretely larger reference voltages supplied to each of said stationary contacts to said bridge circuits by way of said movable contact.

5. A tube tester according to claim 4 including means responsive to balance of said third bridge circuit for ending the test sequence.

References Cited in the file of this patent

UNITED STATES PATENTS

| | | |
|---|---|---|
| 1,560,864 | Schofield | Nov. 10, 1925 |
| 1,771,915 | Campbell | July 29, 1930 |
| 2,278,697 | Gould | Apr. 7, 1942 |
| 2,508,424 | Rouy | May 23, 1950 |
| 2,760,151 | Andrews et al. | Aug. 21, 1956 |
| 2,845,597 | Perkins | July 29, 1958 |
| 2,906,943 | Garman | Sept. 29, 1959 |

OTHER REFERENCES

"Picture-Tube Testers, Reactivators," article in Radio-Electronics, September 1952, pp. 28–31.